US011391454B2

(12) United States Patent
Xu et al.

(10) Patent No.: US 11,391,454 B2
(45) Date of Patent: Jul. 19, 2022

(54) LIGHTING DEVICE (71) Applicant: OPPLE LIGHTING CO., LTD., Shanghai (CN)

(72) Inventors: Qiang Xu, Shanghai (CN); Hongbo Wang, Shanghai (CN); Xuejun Feng, Shanghai (CN); Peng Ren, Shanghai (CN); Chaobo Liu, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 17/134,855

(22) Filed: Dec. 28, 2020

(65) Prior Publication Data

US 2021/0116117 A1   Apr. 22, 2021

Related U.S. Application Data

(63) Continuation of application No. PCT/CN2019/094212, filed on Jul. 1, 2019.

(30) Foreign Application Priority Data

Jun. 29, 2018 (CN) .......................... 201810699612.2
Jun. 29, 2018 (CN) .......................... 201821025594.1

(51) Int. Cl.
*F21V 23/00*  (2015.01)
*F21V 23/04*  (2006.01)
(Continued)

(52) U.S. Cl.
CPC .......... *F21V 23/0464* (2013.01); *F21S 9/035* (2013.01); *F21V 21/088* (2013.01);
(Continued)

(58) Field of Classification Search
CPC .. F21V 23/0464; F21V 21/108; F21V 21/088; F21V 23/0471; F21S 9/035; H02J 7/35
See application file for complete search history.

(56) References Cited

U.S. PATENT DOCUMENTS

| 4,394,718 A * | 7/1983 | Balzer ................ E04F 11/1804 |
| | | 362/146 |
| 7,985,004 B1 * | 7/2011 | Schach .................. F21S 8/083 |
| | | 362/276 |

(Continued)

FOREIGN PATENT DOCUMENTS

| CN | 101144580 A | 3/2008 |
| CN | 201310803 Y | 9/2009 |

(Continued)

OTHER PUBLICATIONS

International Search Report of PCT Application No. PCT/CN2019/094212 dated Sep. 18, 2019 with English translation, (6p).

*Primary Examiner* — Gerald J Sufleta, II
(74) *Attorney, Agent, or Firm* — Arch & Lake LLP (57) ABSTRACT

The present disclosure discloses a lighting device and relates to the field of lighting technology. The lighting device includes a housing, a light source module, a power supply module, a control module, and a sensing module. The light source module, the power supply module, and the control module are collectively accommodated in an accommodating cavity of the housing. The sensing module is configured to detect environmental information, and the control module is configured to adjust brightness of the light source module in combination with remaining electric quantity of the power supply module and the environmental information, so as to adjust the brightness of the light source module according to the actual use environment and the working conditions of the lighting device itself, thereby achieving the purpose of energy saving.

20 Claims, 4 Drawing Sheets

(51) Int. Cl.
*F21S 9/03* (2006.01)
*F21V 21/088* (2006.01)
*F21V 21/108* (2006.01)
*H02J 7/00* (2006.01)
*H02J 7/35* (2006.01)
*F21Y 115/10* (2016.01)
*F21W 131/109* (2006.01)

(52) U.S. Cl.
CPC ........ *F21V 21/108* (2013.01); *F21V 23/0471* (2013.01); *H02J 7/0047* (2013.01); *H02J 7/35* (2013.01); *F21W 2131/109* (2013.01); *F21Y 2115/10* (2016.08)

(56) References Cited

U.S. PATENT DOCUMENTS

| | | | | |
|---|---|---|---|---|
| 9,494,297 | B1* | 11/2016 | Nagengast | F21V 13/04 |
| 10,283,020 | B1* | 5/2019 | Cook | F21V 23/0464 |
| 10,408,399 | B1* | 9/2019 | Demarest | F21S 6/003 |
| 10,424,173 | B1* | 9/2019 | Bien | F21S 9/037 |
| 10,718,500 | B1* | 7/2020 | Tylicki | F21V 23/0471 |
| 2009/0040750 | A1* | 2/2009 | Myer | F21S 9/037 |
| | | | | 362/183 |
| 2011/0075404 | A1* | 3/2011 | Allen | F21S 6/00 |
| | | | | 362/183 |
| 2011/0292644 | A1* | 12/2011 | Cohen | B44C 5/005 |
| | | | | 362/183 |
| 2012/0113625 | A1* | 5/2012 | Werner | F21S 9/037 |
| | | | | 362/183 |
| 2012/0181938 | A1 | 7/2012 | Kay | |
| 2013/0049609 | A1* | 2/2013 | Browder | F21S 9/037 |
| | | | | 315/159 |
| 2016/0131316 | A1* | 5/2016 | Russell | H05B 47/115 |
| | | | | 362/183 |
| 2016/0320050 | A1* | 11/2016 | Barnhart | F21L 4/02 |
| 2019/0017668 | A1* | 1/2019 | Heaton | F21S 9/037 |
| 2019/0266926 | A1* | 8/2019 | Ycedo | F21S 9/032 |
| 2021/0317975 | A1* | 10/2021 | Peng | F21V 17/104 |

FOREIGN PATENT DOCUMENTS

| | | |
|---|---|---|
| CN | 202074398 U | 12/2011 |
| CN | 106895345 A | 6/2017 |
| CN | 206555911 U | 10/2017 |
| CN | 107990267 A | 5/2018 |
| CN | 207471380 U | 6/2018 |
| CN | 108730886 A | 11/2018 |
| CN | 208253422 U | 12/2018 |

* cited by examiner

LIGHTING DEVICE

CROSS-REFERENCE TO RELATED APPLICATIONS

This application is based upon and claims the priority of PCT patent application No. PCT/CN 2019/094212 filed on Jul. 1, 2019 which claims priority to the Chinese patent application No. 201821025594.1 filed on Jun. 29, 2018, and the Chinese patent application No. 201810699612.2 filed on Jun. 29, 2018, the entire content of both of which is hereby incorporated by reference herein for all purposes.

TECHNICAL FIELD

The present disclosure relates to a field of lighting technology, in particular to a lighting device.

BACKGROUND

Garden lamp is a kind of lighting device that can be applied to outdoor environment, and is mainly used for outdoor lighting in urban slow lanes, narrow lanes, residential areas, tourist attractions, parks, squares, and other public places, and can extend the time for people's outdoor activities and improve security of properties.

SUMMARY

The present disclosure provides a lighting device.

In a first aspect, the present disclosure provides a lighting device, which comprises a housing, wherein the housing comprises an accommodating cavity, a bottom wall and an annular wall, the accommodating cavity is enclosed by the bottom wall and the annular wall, and the accommodating cavity comprises a light exit opening opposite to the bottom wall; a light source module, wherein the light source module comprises a light exit surface facing the light exit opening; a power supply module, wherein the power supply module is electrically connected to the light source module; a control module, wherein the control module is electrically connected to the power supply module; and a sensing module, wherein the sensing module is electrically connected to the control module. The light source module, the power supply module, the control module, and the sensing module are accommodated in the accommodating cavity; the sensing module is configured to detect environmental information, and the control module is configured to adjust brightness of the light source module in combination with remaining electric quantity of the power supply module and the environmental information.

In a second aspect, the present disclosure provides a lighting device, which comprises a housing, wherein the housing comprises an accommodating cavity, a bottom wall and an annular wall, the accommodating cavity is enclosed by the bottom wall and the annular wall, and the accommodating cavity comprises a light exit opening opposite to the bottom wall; a light source module, wherein the light source module comprises a light exit surface facing the light exit opening; a power supply module, wherein the power supply module is electrically connected to the light source module; a control module, wherein the control module is electrically connected to the power supply module; and a sensing module, wherein the sensing module is electrically connected to the control module. The light source module, the power supply module, the control module, and the sensing module are accommodated in the accommodating cavity.

It is to be understood that both the foregoing general description and the following detailed description are exemplary and explanatory only and are not restrictive of the present disclosure.

BRIEF DESCRIPTION OF THE DRAWINGS

The drawings described herein are used to provide a further understanding of the present disclosure and form a part of the present disclosure. The illustrative examples of the present disclosure and the descriptions thereof are intended to explain the present disclosure and are not intended to limit the present disclosure. In the drawings.

DETAILED DESCRIPTION

The technical solutions of the present disclosure are described in a clearly and fully understandable way in connection with the examples and the drawings related to the examples. It is apparent that the described examples are just a part but not all of the examples of the disclosure. Based on the examples of the present disclosure, those skilled in the art may obtain other examples, without any creative work, which shall be within the protection scope of the present disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

REFERENCE NUMBERS

100—lighting device;
10—housing;
11—light source part; 111—accommodating cavity; 112—bottom wall; 113—annular wall; 1131—switch hole; 1132—positioning pillar; 114—third wire-passing hole;
115—light exit opening;
12—extending part; 121—installation ring; 1211—wire groove; 1212—circumferential locking component;
13—installation part; 131—first installation region; 132—first half-ring region;
20—light source module; 21—light emitting unit; 22—light exit surface; 23—first wire-passing hole; 24—accommodating region;
30—power supply module;
40—control module; 41—start switch;
50—sensing module;
60—charging module; 61—supporting component; 611—supporting surface; 612—adjustment part; 6121—rotating hole; 6122—locking hole; 62—charging board;

70—connection assembly; 71—connection component; 711—second wire-passing hole; 72—rotating shaft; 73—locking shaft; 80—installation accessory; 81—second installation region; 82—second half-ring region;
90—light distribution element; 91—light incident surface; 92—light exit surface;
93—lens; 94—light shielding element; 941—connection part; 942—light shielding part.

Sometimes, light source modules in garden lamps may have only power-on and power-off functions, and the brightness of the current garden lamps cannot be adjusted according to the actual situations.

Example 1

Figure 1:
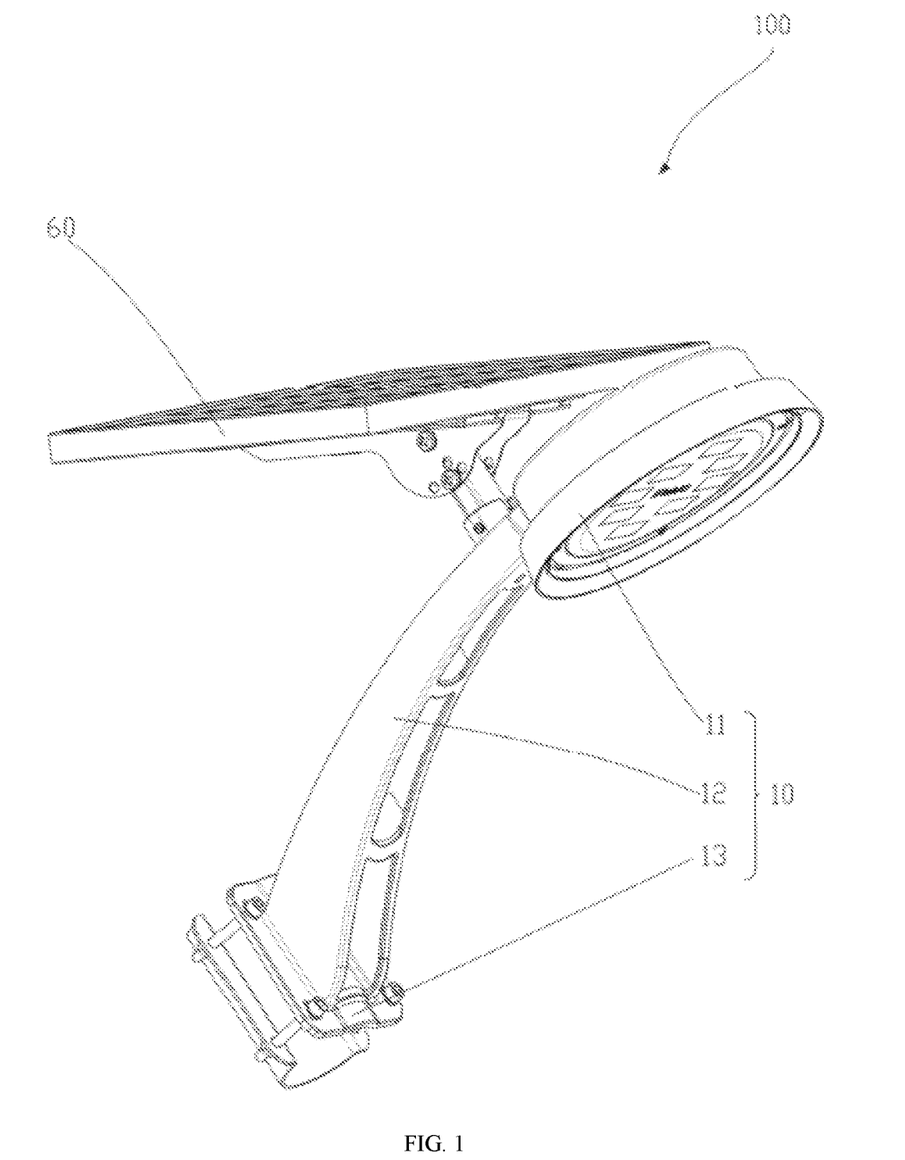
FIG. 1 is a structural diagram of a lighting device in an example of the present disclosure.
Figure 2:
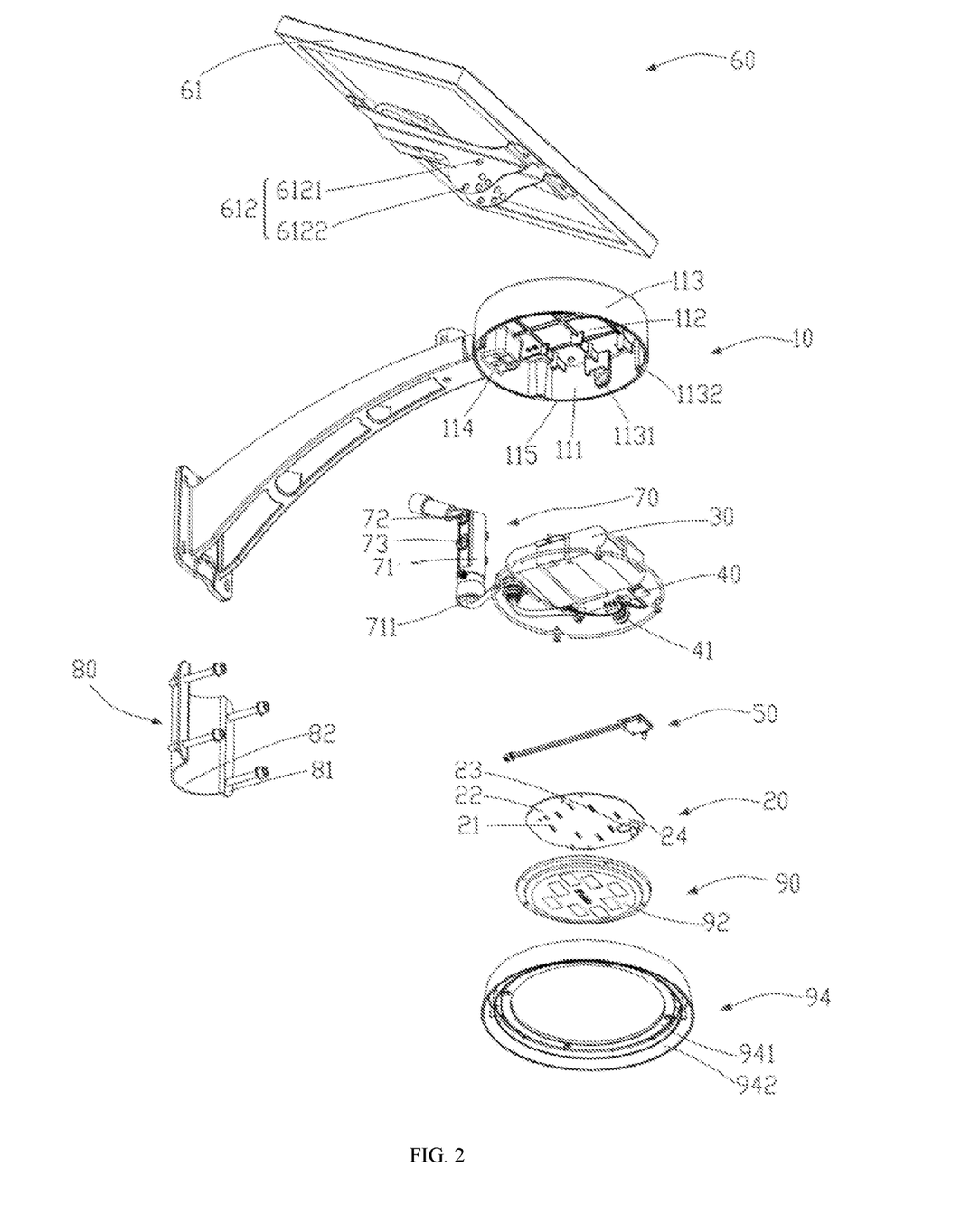
FIG. 2 is an exploded view of the lighting device in FIG. 1 from a perspective.
Figure 3:
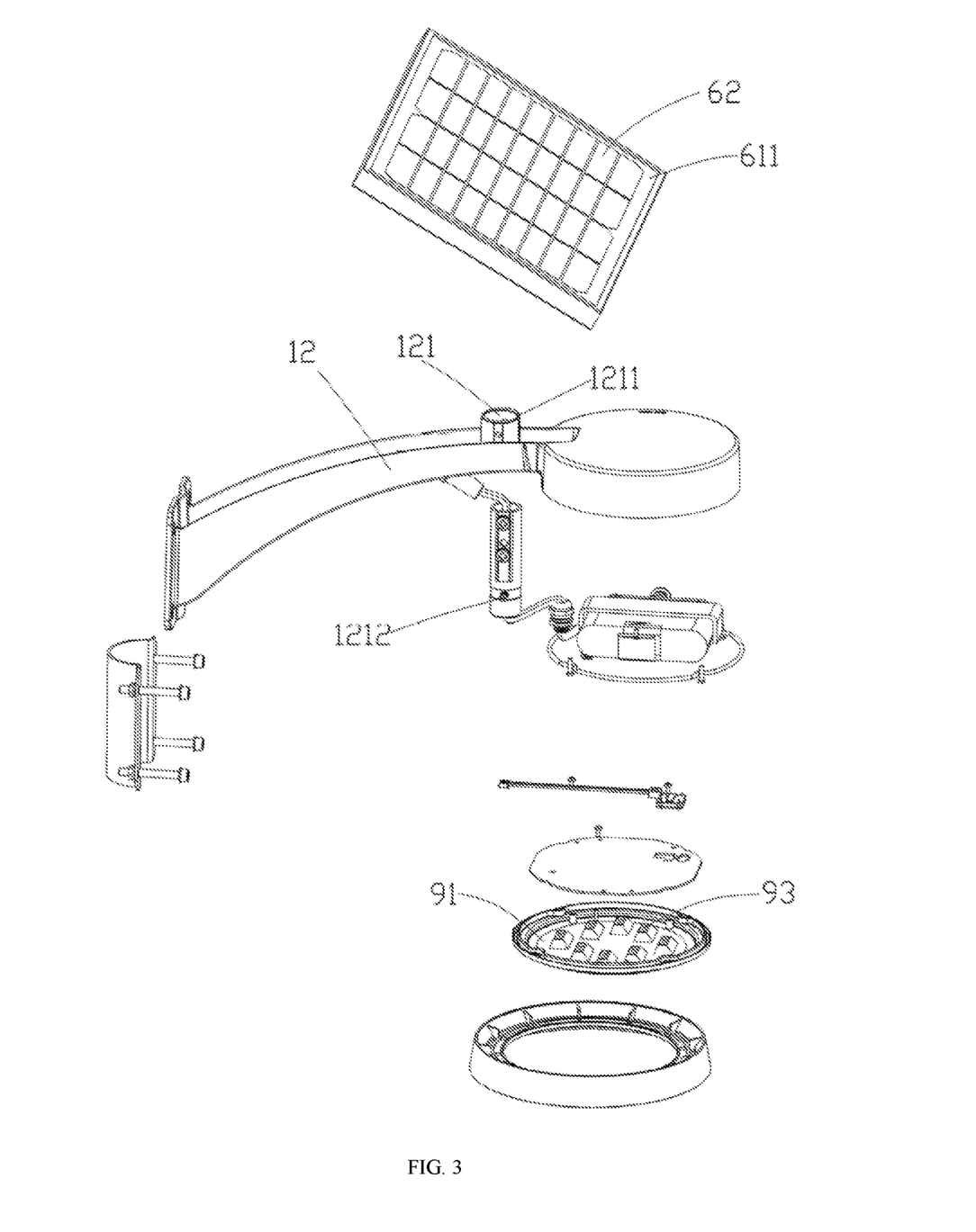
FIG. 3 is an exploded view of the lighting device in FIG. 1 from another perspective.

Referring to FIG. 1, FIG. 2, and FIG. 3, a lighting device 100 provided by an example of the present disclosure includes a housing 10, a light source module 20, a power supply module 30, a control module 40, and a sensing module 50.

The housing 10 has an accommodating cavity 111, a bottom wall 112 and an annular wall 113 surrounding to form the accommodating cavity 111, and the accommodating cavity 111 has a light exit opening 115 disposed opposite to the bottom wall 112. The light source module 20 is disposed in the accommodating cavity 111, and has a light exit surface 22 facing the light exit opening 115. The power supply module 30 is also disposed in the accommodating cavity 111, and the power supply module 30 is electrically connected to the light source module 20 to provide power to the light source module 20. The control module 40 is disposed in the accommodating cavity 111, the control module 40 is electrically connected to the power supply module 30 to control the power output of the power supply module 30, and the sensing module 50 is located in the accommodating cavity 111 and is electrically connected to the control module 40. The sensing module 50 is configured to detect environmental information, and the control module 40 can adjust the brightness of the light source module 20 in combination with the environmental information and remaining electric quantity of the power supply module 30, thereby achieving the purpose of energy saving.

The above-mentioned environmental information includes a with-human state or a without-human state, and the sensing module has a normal dimming mode and a low-power dimming mode. A voltage monitoring sub-module in the control module 40 is used to monitor the remaining electric quantity of the power supply module 30, and according to the remaining electric quantity in the power supply module 30, the sensing module 50 is driven to enter the normal dimming mode or the low-power dimming mode. In a case where the remaining electric quantity in the power supply module 30 is relatively more, the sensing module 50 enters the normal dimming mode. In a case where the remaining electric quantity in the power supply module 30 is less, the sensing module 50 enters the low-power dimming mode, compared with the normal dimming mode, the low-power dimming mode saves more power. A critical value is defined, in a case where the remaining electric quantity of the power supply module 30 is greater than the critical value, the sensing module 50 enters the normal dimming normal mode, and in a case where the remaining electric quantity is less than the critical value, the sensing module 50 enters the low-power dimming mode. The critical value may be 60%, 50%, or 30%, etc. For example, in a case where the remaining electric quantity in the power supply module 30 is more than 50%, it is the normal dimming mode, and in a case where the remaining electric quantity is less than 50%, it is the low-power dimming mode.

In the normal dimming mode, it is divided into the with-human state and the without-human state: in the without-human state, the brightness is 20% for the first 3 hours, the brightness is 10% for the next 3 hours, and the lamp is off for the rest of the time until dawn; in the with-human state, the 100% brightness lasts for 15 seconds in the first 6 hours, and the 50% brightness lasts for 15 seconds in the rest of the time. In the low-power dimming mode, the lamp will be turned on automatically after dark, in the without-human state, the brightness will be 10% for the first 6 hours, and the lamp will be off for the rest of the time until dawn, and in the with-human state, the brightness will be 20% and lasts for 15 seconds. In addition, in the without-human state, in a case where a human body appears in an illuminated area, the sensing module 50 can end the without-human state and enter the with-human state in advance; similarly, during the with-human state, it can also be switched to the without-human state according to the actual situation in the illuminated area.

The dawn or dark can be judged according to the output voltage of the charging module 60, in a case where the output voltage of the charging module 60 is greater than the first threshold, it means that there is enough natural light in the environment, that is, it is dawn (the light source module 20 is also powered off in this case); when it is dark, in a case where the output voltage of the charging module 60 is less than the first threshold, it indicates that there is very little natural light in the environment, that is, it is dark (the light source module 20 is energized in this case).

The sensing module 50 may be a microwave module (microwave sensing module or microwave movement sensor module), or other sensors capable of monitoring whether there is human activity in the environment, such as infrared sensors, etc., which will not be repeated.

A light emitting unit 21 is installed on the light exit surface 22, and the light emitting unit 21 is disposed toward the light exit opening 115, that is, the light of the light emitting unit 21 is emitted out from the light exit opening 115. The power supply module 30 is arranged between the light source module 20 and the bottom wall 112, and the control module 40 may also be arranged between the light source module 20 and the bottom wall 112. The sensing module 50 is located on a position of the light source module 20 away from the bottom wall 112. In order not to block the light emitted by the light emitting unit 21, the sensing module 50 needs to avoid the light exit surface 22.

The control module 40 and the power supply module 30 may be arranged side by side between the bottom wall 112 and the light source module 20. Several internal threaded pillars are arranged in the accommodating cavity 111. The internal threaded pillars extend from the bottom wall 112 toward the light exit opening 115. The power supply module 30 and the control module 40 can be fastened to the internal threaded pillars by fasteners. The fasteners refer to screws or bolts, etc.

The annular wall 113 is provided with a switch hole 1131, the control module 40 has a start switch 41, the start switch 41 is arranged on the switch hole 1131, so as to press the start switch 41 on the switch hole 1131 to achieve the operation of the control module 40.

The light source module 20 further includes a light source board, and the light emitting unit 21 is installed on the light source board. The light source board is provided with a first wire-passing hole 23, and the first wire-passing hole 23 is used for wires to pass through. The sensing module 50 is electrically connected to the control module 40 through a wire. The light source board may not be provided with the first wire-passing hole 23, and the wire can be wound to a periphery of the light source board and then pass through to the control module 40.

The lighting device 100 may further include a charging module 60 and a connection assembly 70, and the connection assembly 70 is connected to the charging module 60 and the housing 10. The connection assembly 70 may extend from the housing 10 in a direction away from the light exit opening 115. The charging module 60 is arranged outside the housing 10, the charging module 60 is connected to the housing 10 through the connection assembly 70, the charging module 60 is electrically connected to the control module 40 and the power supply module 30, and the control module 40 controls the charging module 60 to charge the power supply module 30.

The charging module 60 has an output terminal for outputting electric energy, and the output terminal may be connected to the power supply module 30 to charge the power supply module 30. The control module 40 includes a voltage monitoring sub-module and a driving sub-module, and the voltage monitoring sub-module is connected to the output terminal to obtain an output voltage of the output terminal. In a case where the output voltage of the output terminal is greater than or equal to a first threshold, the charging module 60 receives a large amount of external energy, for example, the photovoltaic module receives a large amount of light energy during the daytime, the output voltage of the output terminal is relatively high, the light source module 20 may be powered off, and the lighting device 100 does not need to emit light. In a case where the output voltage of the output terminal is less than the first threshold, the external energy received by the charging module 60 is very small, for example, in a case where the sky is getting dark or cloudy, the photovoltaic module can only receive a small amount of light energy, the output voltage of the output terminal is low, and the light source module 20 may be energized.

An input voltage of the power supply module 30 is a second threshold, and the second threshold is greater than the first threshold. A value of the first threshold may be 3V, and a value of the second threshold may be 12.8V; the values of the first threshold and the second threshold are not limited to this case, as long as the first threshold and the second threshold meet the above-mentioned magnitude relationship.

In a case where the output voltage of the charging module 60 is greater than the second threshold, it means that the charging module 60 can receive a larger amount of external energy at this time, for example, at noon during the daytime, the photovoltaic module can receive a larger amount of light energy, the output voltage of the output terminal is relatively higher, and furthermore, the driving sub-module drives the electric energy of the charging module 60 to be input to the power supply module 30, that is, the power supply module 30 is charged, and the light source module 20 is powered off at the same time. In a case where the output voltage of the charging module 60 is between the first threshold and the second threshold, the external energy received by the charging module 60 is relatively small, the output voltage of the output terminal is relatively small, and the charging module 60 stops charging the power supply module 30, at the same time, because the output voltage of the charging module 60 is greater than or equal to the first threshold, the light source module 20 is powered off.

Figure 4:
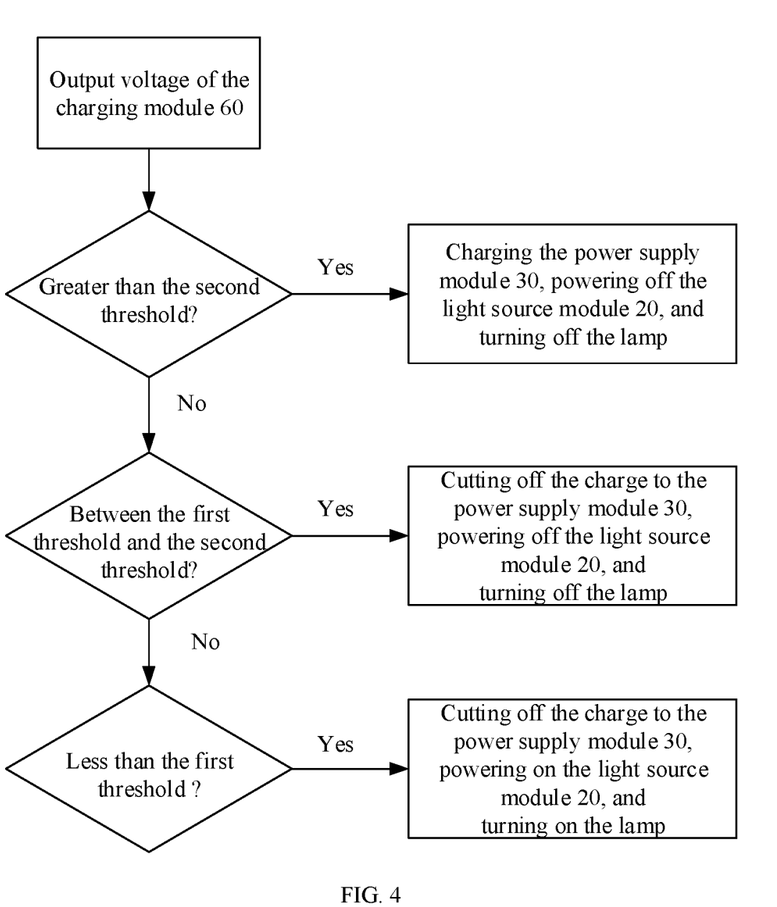
FIG. 4 is a logical block diagram of the lighting device of the present disclosure.

The control module 40 monitors the output voltage of the charging module 60, and adjusts the working state of the light source module 20 and the working state of the power supply module 30 according to the output voltage of the charging module 60, as shown in FIG. 4, in a case where the output voltage of the charging module 60 is greater than the second threshold, the charging module 60 charges the power supply module 30, and the light source module 20 is powered off; in a case where the output voltage of the charging module 60 is between the first threshold and the second threshold, the charging module 60 stops charging the power supply module 30, and the light source module 20 is powered off and the lamp is turned off; in a case where the output voltage of the charging module is less than the first threshold, the charging module 60 stops charging the power supply module 30, and the light source module 20 is powered on and the lamp is turned on.

The charging module 60 may include a supporting frame 61 and a charging board 62. The supporting frame 61 has a supporting surface 611 and a back surface (not numbered) disposed opposite to each other, and has an adjustment part 612, and the adjustment part 612 is connected to the back surface. The charging board 62 is arranged on the supporting surface 611, and the charging board 62 receives external energy and converts the external energy into electrical energy. The adjustment part 612 is connected to the connection assembly 70. The adjustment part 612 is located in the middle of the support frame 61 and is rotatably connected to the connection assembly 70. Around a direction perpendicular to an extending direction of the connection assembly 70, the adjustment part 612 is rotatably connected with the connection assembly 70.

The connection assembly 70 includes a connection component 71, a rotating shaft 72, and a locking shaft 73. The connection component 71 is connected to the housing 10 and extends in a direction away from the light exit opening 115, the rotating shaft 72 and the locking shaft 73 are arranged in parallel and are both perpendicular to an extending direction of the connection component 71. The adjustment part 612 has a rotating hole 6121 and at least two groups of locking holes 6122, the rotating hole 6121 and the at least two groups of locking holes 6122 are arranged in parallel. The rotating shaft 72 connects the connection component 71 and the rotating hole 6121, and the locking shaft 73 connects the connection component 71 and one group of locking holes 6122. The locking shaft 73 connects the connection component 71 to different groups of locking holes 6122, and the rotating shaft 72 connects the rotating hole 6121, so that the adjustment part 612 can rotate around the rotating shaft 72, and thus it can be achieved that the angle of the charging board 62 relative to the bottom wall 112 is adjusted. After the lighting device 100 is installed, if the bottom wall 112 is arranged horizontally, the angle of the supporting surface 611 and the angle of the charging board 62 relative to the bottom wall 112 can be changed, so that energy from the external environment can be fully received. For example, in a case where the charging board 62 is a photovoltaic board, the user can adjust the light energy value received by the photovoltaic board by adjusting the angle of the photovoltaic board.

The number of the groups of locking holes 6122 may be two, three, or four groups, etc., and each group of locking holes 6122 may have one hole, two holes, or three holes, etc., however, no matter how many locking holes 6122 are provided in each group of locking holes 6122, the locking holes 6122 of the same group are arranged coaxially, so that the locking shaft 73 can connect all the locking holes 6122 of the same group.

As shown in FIG. 2, the adjustment part 612 has four groups of locking holes 6122, the bottom wall 112 is horizontally arranged, and the included angle between the supporting surface 611 (that is, the charging board 62) and the bottom wall 112 may be 0°, 30°, 40°, or 50°. Three groups of locking holes 6122 surround the rotating hole 6121 with the rotating hole 6121 as the axis, that is, the distances between the three groups of locking holes 6122 and the rotating hole 6121 remain unchanged, the rotating hole 6121 is connected to the rotating shaft 72, after the three groups of locking holes 6122 are connected to the locking shaft 73, the included angles between the supporting surface 611 and the bottom wall 112 are 0°, 30°, and 50°, respectively. There is also a group of locking holes 6122 between the locking holes 6122 capable of obtaining an included angle of 30° and the locking holes 6122 capable of obtaining an included angle of 50°, and this group of locking holes 6122 can make the included angle between the supporting surface 611 and the bottom wall 112 be 40°. The distance between the locking shaft 73 on the connection component 71 and the rotating shaft 72 can be adjusted.

The rotating shaft 72 and the locking shaft 73 may be screws screwed on the connection component 71. The connection component 71 may have at least two groups of threaded holes, and axial directions of the threaded holes are perpendicular to the extending direction of the connection component 71, the rotating shaft 72 and the locking shaft 73 are respectively connected with two groups of threaded holes. Each group of threaded holes may have at least one threaded hole, and the threaded holes of the same group are arranged coaxially.

Around the axis of the connection assembly 70, the connection assembly 70 is rotatable relative to the housing 10, that is, the connection assembly 70 can rotate 360° in the horizontal direction of the lighting device 100, and combined with the angle adjustment function of the adjustment part 612, the angle adjustment of the photovoltaic board can be achieved. A spatial coordinate system can be defined, taking a connection position of the connection assembly 70 and the housing 10 as the origin, taking an extending direction of the connection assembly 70 as the Z axis, and taking two directions perpendicular to the connection assembly 70 as X axis and Y axis, respectively, and therefore the charging module 60 can rotate 360° around the Z axis, and the adjustment part 612 is used to implement the rotation of the charging module 60 around one of the X axis or the Y axis.

The housing 10 may be provided with an installation ring 121, the installation ring 121 extends from the housing 10 in a direction away from the light exit opening 115, and the connection component 71 is rotatably nested in the installation ring 121, so as to achieve the rotation of the connection assembly 70 relative to the housing 10.

A circumferential locking component 1212 is also installed on the installation ring 121. The circumferential locking component 1212 can connect the installation ring 121 and the connection component 71 in an inserted manner in a direction perpendicular to the extending direction of the connection component to prevent the connection component 71 from rotating circumferentially relative to the installation ring 121. If the circumferential locking element 1212 is pulled out of the connection component 71, the connection component 71 can rotate relative to the installation ring 121 in the circumferential direction.

Along the extending direction of the connection component 71, the connection component 71 is provided with a second wire-passing hole 711 penetrating through the connection component 71, the light source part 11 is provided with a third wire-passing hole 114 penetrating through the annular wall 113 or the bottom wall 112, and the installation ring 121 is provided with a wire groove 1211 connecting the second wire-passing hole 711 and the third wire-passing hole 114. A wire may pass through the second wire-passing hole 711, the wire groove 1211, and the third wire-passing hole 114 in sequence, so that the charging module 60 can be electrically connected to the control module 40 and the power supply module 30.

In order to prevent external objects or rain from entering the accommodating cavity 111, a waterproof connector may be provided on the third wire-passing hole 114.

The charging module 60 may be a photovoltaic module, the charging board 62 may be a photovoltaic board, and the light emitting unit 21 may be a light emitting diode. The charging module 60 may be a module that converts wind energy or other energy into electrical energy, which will not be described again.

The housing 10 has a light source part 11, an extending part 12, and an installation part 13. The extending part 12 connects the light source part 11 and the installation part 13. The light source part 11 is provided with the accommodating cavity 111, the bottom wall 112, and the annular wall 113. The extending part 12 is provided with the above-mentioned installation ring 121. The light source part 11 and the installation part 13 are separated and connected by setting the extending part 12. The installation part 13 is installed on a wall, a wallboard, or a pillar, and the light source part 11 and the installation part 13 are kept at a distance to avoid light from directly incident on the wall, the wallboard, or the pillar.

The extending part 12 extends from the annular wall 113 toward a direction away from the axis of the accommodating cavity 111, in other words, projections of the extending part 12 and the installation part 13 on the surface where the bottom wall 112 is located are outside the bottom wall 112 (not located in the region of the bottom wall), so that the light exit path of the light source module 20 installed in the accommodating cavity 111 will not be blocked by the installation part 13 or the extending part 12.

The light source part 11, the extending part 12, and the installation part 13 may be integrally provided, thereby simplifying the structure of the lighting device 100. The installation ring 121 may be connected to the extending part 12.

The installation part 13 is in a sheet shape and includes a first half-ring region 132 and two first installation regions 131. The two first installation regions 131 are respectively located at two ends of the installation part 13, and the first installation region 131 is provided with a first installation hole. Each of the two first installation regions 131 is in a shape of a flat plate and the two first installation regions 131 are located on the same plane, and the two first installation regions 131 of the installation part 13 are attached to the wall or wallboard, and then a fastener is used to pass through the first installation hole to implement the fastening connection between the first installation region 131 and the wall or wallboard, thereby completing the installation and fixation of the lighting device 100. The first installation region 131 may not be provided with the first installation hole, and the installation part 13 may be connected to the wall or wallboard in other ways, such as bonding, plugging, or hooking, etc. The first half-ring region 132 connects the two first installation regions 131. The first half-ring region 132 is in an arc shape and is arched toward the extending part 12, so that the installation part 13 can be installed on a non-planar wall or wallboard, such as on the pillar.

The extending direction of the installation part 13 may be perpendicular to the bottom wall 112, and the extending direction of the first half-ring region 132 and the extending direction of the first installation region 131 are the same as the extending direction of the installation part 13.

The lighting device 100 may further include an installation accessory 80. When the lighting device 100 needs to be installed on a pillar, the installation accessory 80 can be used to cooperate with the installation part 13 to achieve the fixed installation of the lighting device 100. The installation accessory 80 may be in a sheet shape, and the installation accessory 80 may include a second half-ring region 82 and two second installation regions 81, and the two second installation regions 81 are located at two ends of the installation accessory 80, respectively. Each of the two second installation regions 81 is in a shape of a flat plate and the two second installation regions 81 are located on the same plane. The second half-ring region 82 connects the two second installation regions 81, and the second half-ring region 82 is arched in an arc shape. The two first installation regions 131 can be connected to the two second installation regions 81 in a butt-joint manner, and the first half-ring region 132 and the second half-ring region 82 can be spliced into an open ring or a closed ring to clamp an object, such as a pillar, between the first half-ring region 132 and the second half-ring region 82, the first installation region 131 is provided with a first installation hole, and the second installation region 81 is provided with a second installation hole. The fastener passes through the first installation hole and the second installation hole to achieve the connection between the installation accessory 80 and the installation part 13. Both the first half-ring region 132 and the second half-ring region 82 are clamped on the pillar to achieve the installation and fixation of the lighting device 100.

The light source module 20 has a light exit surface 22 on which the light emitting unit 21 is installed, and the lighting device 100 further includes a light distribution element 90, and the light distribution element 90 is covered on the light exit surface 22. The light distribution element 90 has a light incident surface 91 and a light exit surface 92, which are opposite to each other. The light incident surface 91 faces the light exit surface 22 and is provided with an accommodating region 24 that avoids the light emitting unit 21, and the sensing module 50 is provided on the accommodating region 24, the light exit surface 92 may be a flat surface, which is convenient for cleaning and maintenance.

The light distribution element 90 may include a lens 93, the lens 93 extends from the light incident surface 91 toward the light exit surface 22 and is covered on the light emitting unit 21. The lens 93 is a deflection lens 93, and can make the emitted light of the light emitting unit 21 emit in a deflected form. The deflection lens 93 may be a total reflection sheet lens 93. In a direction from the light source part 11 to the installation part 13, the deflection lens 93 is symmetrically arranged, and the light distribution of the deflection lens 93 is also bilaterally symmetrical; and in a direction perpendicular to the direction from the light source part 11 to the installation part 13, the light distribution of the deflection lens 93 is a deflected light distribution, and the light is deflected to a direction away from the installation part 13, so as to avoid light from concentrating on the area close to the installation part 13.

A positioning pillar 1132 is provided in the accommodating cavity 111, the positioning pillar 1132 extends from the bottom wall 112 toward the light exit opening 115 and is attached to the annular wall 113. A fastener passes through the light distribution element 90 and the positioning pillar 1132, and can achieve the fastening connection between the light distribution element 90 and the housing 10.

The lighting device 100 may further include a light shielding element 94, and the light shielding element 94 has a light shielding part 942 and a connection part 941, the connection part 941 is connected to the positioning pillar 1132, and the light shielding part 942 extends from the connection part 941 in a direction away from the bottom wall 112, the light shielding element 94 is used to control the emitted light of the light source module 20 to avoid the scattering of the light, thereby achieving concentrated lighting. The connection part 941 is in a ring shape, and is connected with the positioning pillar 1132 through threads.

The assembly process of the lighting device 100 provided by the examples of the present disclosure is summarized as follows: installing the control module 40 and the power supply module 30 in the accommodating cavity 111, and then installing the light source module 20, the sensing module 50, and the light distribution element in sequence; connecting the charging module 60 to the housing 10, and electrically connecting the charging module 60 to the control module 40 and the power supply module 30 in the accommodating cavity 111, thereby completing the assembly of the lighting device 100.

Therefore, the lighting device provided by the examples of the present disclosure includes the housing, the light source module, the power supply module, the control module, and the sensing module. The light source module, the power supply module, and the control module are collectively accommodated in the accommodating cavity of the housing, the sensing module is arranged in the accommodating cavity, and the sensing module is used to detect environmental information, the control module is used to adjust the brightness of the light source module in combination with the environmental information and the remaining electric quantity of the power supply module, so as to adjust the brightness of the light source module according to the actual use environment and the working conditions of the lighting device itself, so as to achieve the purpose of energy saving.

Example 2

Referring to FIG. 1, FIG. 2, and FIG. 3, a lighting device 100 provided by another example of the present disclosure includes a housing 10, a light source module 20, a power supply module 30, a control module 40, and a sensing module 50.

The housing 10 has an accommodating cavity 111, a bottom wall 112 and an annular wall 113 surrounding to form the accommodating cavity 111, and the accommodating cavity 111 has a light exit opening 115 disposed opposite to the bottom wall 112. The power supply module 30 is also disposed in the accommodating cavity 111, and the power supply module 30 is electrically connected to the light source module 20 to provide power to the light source module 20. The control module 40 is disposed in the accommodating cavity 111, the control module 40 is electrically connected to the power supply module 30 to control the power output of the power supply module 30. The sensing module 50 is electrically connected to the control module 40, the sensing module 50 can detect environmental information. The control module 40 receives the detection information of the sensing module 50, and the control module 40 can adjust the brightness of the light source module 20 in combination with the detection information and the remaining electric quantity of the power supply module 30.

The light source module 20 is disposed in the accommodating cavity 111, the light source module 20 has a light emitting unit 21, and the light emitting unit 21 is disposed toward the light exit opening 115, that is, the light of the light emitting unit 21 is emitted out from the light exit opening 115. The power supply module 30 may be disposed between the light source module 20 and the bottom wall 112. The control module 40 may be located between the light source module 20 and the bottom wall 112. The sensing module 50 may be located on a position of the light source module 20 away from the bottom wall 112. In order not to block the light emitted by the light emitting unit 21, the sensing module 50 needs to avoid the light emitting unit 21.

In the above-mentioned lighting device 100, the light source module 20, the power supply module 30, the control module 40, and the sensing module 50 are collectively accommodated in the accommodating cavity 111, so that the overall structure of the lighting device 100 is more compact and the volume of the lighting device 100 is smaller.

The control module 40 and the power supply module 30 may be arranged side by side between the bottom wall 112 and the light source module 20. Several internal threaded pillars are arranged in the accommodating cavity 111, and the internal threaded pillars extend from the bottom wall 112 toward the light exit opening 115, the power supply module 30 and the control module 40 can be fastened to the internal threaded pillars by fasteners. The fasteners refer to screws or bolts, etc.

The annular wall 113 is provided with a switch hole 1131, the control module 40 has a start switch 41, the start switch 41 is arranged on the switch hole 1131, so as to press the start switch 41 on the switch hole 1131 to achieve the operation of the control module 40.

The light source module 20 further includes a light source board, and the light emitting unit 21 is installed on the light source board. The light source board is provided with a first wire-passing hole 23, and the first wire-passing hole 23 is used for wires to pass through. The sensing module 50 is electrically connected to the control module 40 through a wire. The light source board may also not be provided with the first wire-passing hole 23, and the wire can be wound to a periphery of the light source board and then pass through to the control module 40.

The lighting device 100 may further include a charging module 60 and a connection assembly 70, the connection assembly 70 may extend from the housing 10 in a direction away from the light exit opening 115, and the connection assembly 70 connects the charging module 60 and the housing 10. The charging module 60 is arranged outside the housing 10, the charging module 60 is connected to the housing 10 through the connection assembly 70, the charging module 60 is electrically connected to the control module 40 and the power supply module 30, and the control module 40 controls the charging module 60 to charge the power supply module 30.

The charging module 60 may include a supporting frame 61 and a charging board 62. The supporting frame 61 has a supporting surface 611 and a back surface (not numbered) disposed opposite to each other, and has an adjustment part 612, and the adjustment part 612 is connected to the back surface. The charging board 62 is arranged on the supporting surface 611, and the charging board 62 receives external energy and converts the external energy into electrical energy. The adjustment part 612 is connected to the connection assembly 70. The adjustment part 612 is located in the middle of the support frame 61 and can be rotatably connected to the connection assembly 70. Around a direction perpendicular to an extending direction of the connection assembly 70, the adjustment part 612 and the connection assembly 70 are rotatably connected.

The connection assembly 70 includes a connection component 71, a rotating shaft 72, and a locking shaft 73. The connection component 71 is connected to the housing 10 and extends in a direction away from the light exit opening 115, the rotating shaft 72 and the locking shaft 73 are arranged in parallel and are both perpendicular to an extending direction of the connection component 71. The adjustment part 612 has a rotating hole 6121 and at least two groups of locking holes 6122, the rotating hole 6121 and the at least two groups of locking holes 6122 are arranged in parallel. The rotating shaft 72 connects the connection component 71 and the rotating hole 6121, and the locking shaft 73 connects the connection component 71 and one group of locking holes 6122. The locking shaft 73 connects the connection component 71 to different groups of the locking holes 6122, and the rotating shaft 72 connects the rotating hole 6121, so that the adjustment part 612 can rotate around the rotating shaft 72, and thus it can be achieved that the angle of the charging board 62 relative to the bottom wall 112 is adjusted. After the lighting device 100 is installed, if the bottom wall 112 is arranged horizontally, the angle of the supporting surface 611 and the angle of the charging board 62 relative to the bottom wall 112 maybe changed, so that the external environment can be fully received. For example, in a case where the charging board 62 is a photovoltaic board, the user can adjust the light energy value received by the photovoltaic board by adjusting the angle of the photovoltaic board.

The number of the groups of locking holes 6122 may be two, three, or four groups, etc., and each group of locking holes 6122 may have one hole, two holes, or three holes, etc., however, no matter how many locking holes 6122 are provided in each group of locking holes 6122, the locking holes 6122 of the same group are arranged coaxially, so that the locking shaft 73 can connect all the locking holes 6122 of the same group.

As shown in FIG. 2, the adjustment part 612 has four groups of locking holes 6122, the bottom wall 112 is horizontally arranged, and the included angle between the supporting surface 611 (that is, the charging board 62) and the bottom wall 112 may be 0°, 30°, 40°, or 50°. The three groups of locking holes 6122 surround the rotating hole 6121 with the rotating hole 6121 as the axis, that is, the distances between the three groups of locking holes 6122 and the rotating hole 6121 remain unchanged, the rotating hole 6121 is connected to the rotating shaft 72, after the three groups of locking holes 6122 are connected to the locking shaft 73, the included angles between the supporting surface 611 and the bottom wall 112 are 0°, 30°, and 50°, respectively. There is also a group of locking holes 6122 between the locking holes 6122 capable of obtaining an included angle of 30° and the locking holes 6122 capable of obtaining an included angle of 50°, and this group of locking holes 6122 can make the included angle between the supporting surface 611 and the bottom wall 112 be 40°. The distance between the locking shaft 73 on the connection component 71 and the rotating shaft 72 can be adjusted.

The rotating shaft 72 and the locking shaft 73 may be screws screwed on the connection component 71. The connection component 71 may have at least two groups of threaded holes, and axial directions of the threaded holes are perpendicular to the extending direction of the connection component 71, the rotating shaft 72 and the locking shaft 73 are respectively connected with two groups of threaded holes. Each group of threaded holes may have at least one threaded hole, and the threaded holes of the same group are arranged coaxially.

Around the axis of the connection assembly 70, the connection assembly 70 is rotatable relative to the housing 10, that is, the connection assembly 70 can rotate 360° in the horizontal direction of the lighting device 100, and combined with the angle adjustment function of the adjustment part 612, the angle adjustment of the photovoltaic board can be achieved. A spatial coordinate system can be defined, taking a connection position of the connection assembly 70 and the housing 10 as the origin, taking an extending direction of the connection assembly 70 as the Z axis, and taking two directions perpendicular to the connection assembly 70 as X axis and Y axis, respectively, and therefore the charging module 60 can rotate 360° around the Z axis, and the adjustment part 612 is used to implement the rotation of the charging module 60 around one of the X axis or the Y axis.

The housing 10 may be provided with an installation ring 121, the installation ring 121 extends from the housing 10 in a direction away from the light exit opening 115, and the connection component 71 is rotatably nested in the installation ring 121, so as to achieve the rotation of the connection assembly 70 relative to the housing 10.

A circumferential locking component 1212 is also installed on the installation ring 121. The circumferential locking component 1212 can connect the installation ring 121 and the connection component 71 in an inserted manner in a direction perpendicular to the extending direction of the connection component to prevent the connection component 71 from rotating circumferentially relative to the installation ring 121. If the circumferential locking element 1212 is pulled out of the connection component 71, the connection component 71 can rotate relative to the installation ring 121 in the circumferential direction.

Along the extending direction of the connection component 71, the connection component 71 is provided with a second wire-passing hole 711 penetrating through the connection component 71, the light source part 11 is provided with a third wire-passing hole 114 penetrating through the annular wall 113 or the bottom wall 112, and the installation ring 121 is provided with a wire groove 1211 connecting the second wire-passing hole 711 and the third wire-passing hole 114. A wire may pass through the second wire-passing hole 711, the wire groove 1211, and the third wire-passing hole 114 in sequence, so that the charging module 60 can be electrically connected to the control module 40 and the power supply module 30.

In order to prevent external objects or rain from entering the accommodating cavity 111, a waterproof connector may be provided on the third wire-passing hole 114.

The charging module 60 may be a photovoltaic module, the charging board 62 may be a photovoltaic board, and the light emitting unit 21 may be a light emitting diode. The charging module 60 may be a module that converts wind energy or other energy into electrical energy, which will not be described again.

The charging module 60 has an output terminal for outputting electric energy, and the output terminal may be connected to the power supply module 30 to charge the power supply module 30. The control module 40 includes a voltage monitoring sub-module and a driving sub-module, and the voltage monitoring sub-module is connected to the output terminal to obtain an output voltage of the output terminal. In a case where the output voltage of the output terminal is greater than a first threshold, the charging module 60 receives a large amount of external energy, for example, the photovoltaic module receives a large amount of light energy during the daytime, the output voltage of the output terminal is relatively high, the light source module 20 can be powered off, and the lighting device 100 does not need to emit light; in a case where the output voltage of the output terminal is less than the first threshold, the external energy received by the charging module 60 is very small, for example, in a case where the sky is getting dark or cloudy, the photovoltaic module can only receive a small amount of light energy, the output voltage of the output terminal is low, and the light source module 20 can be energized.

An input voltage of the power supply module 30 is a second threshold, and the second threshold is greater than the first threshold. A value of the first threshold may be 3V, and a value of the second threshold may be 12.8V; the values of the first threshold and the second threshold are not limited to this case, as long as the first threshold and the second threshold meet the above-mentioned magnitude relationship.

In a case where the output voltage of the charging module 60 is greater than the second threshold, it means that the charging module 60 can receive a larger amount of external energy at this time, for example, at noon during the daytime, the photovoltaic module can receive a larger amount of light energy, the output voltage of the output terminal is relatively higher, and furthermore, the driving sub-module drives the electric energy of the charging module 60 to be input to the power supply module 30, that is, the power supply module 30 is charged; in a case where the output voltage of the charging module 60 is less than the second threshold, the external energy received by the charging module 60 is relatively small, the output voltage of the output terminal is relatively small, and the charging module 60 stops charging the power supply module 30.

The control module 40 monitors the output voltage of the charging module 60, and adjusts the working state of the light source module 20 and the working state of the power supply module 30 according to the output voltage of the charging module 60, as shown in FIG. 4, in a case where the output voltage of the charging module 60 is greater than the second threshold, the charging module 60 charges the power supply module 30, and the light source module 20 is powered off; in a case where the output voltage of the charging module 60 is between the first threshold and the second threshold, the charging module 60 stops charging the power supply module 30, and the light source module 20 is powered off and the lamp is turned off; in a case where the output voltage of the charging module is less than the first threshold, the charging module 60 stops charging the power supply module 30, and the light source module 20 is powered on and the lamp is turned on.

The above-mentioned sensing module 50 can monitor environmental information, and the control module 40 can adjust the brightness of the light source module 20 in combination with the environmental information and the remaining electric quantity of the power supply module 30, thereby achieving the purpose of energy saving.

The above-mentioned environmental information includes a with-human state or a without-human state, and the sensing module has a normal dimming mode and a low-power dimming mode. The voltage monitoring sub-module of the control module 40 is also used to monitor the remaining electric quantity of the power supply module 30, and according to the remaining electric quantity in the power supply module 30, the sensing module 50 is driven to enter the normal dimming mode or the low-power dimming mode. In a case where the remaining electric quantity in the power supply module 30 is relatively more, the sensing module 50 enters the normal dimming mode, and in a case where the remaining electric quantity in the power supply module 30 is less, the sensing module 50 enters the low-power dimming mode, compared with the normal dimming normal mode, the low-power dimming mode saves more power. A critical value is defined for the remaining electric quantity of the power supply module 30, in a case where the remaining electric quantity of the power supply module 30 is greater than the critical value, the sensing module 50 enters the normal dimming normal mode, and in a case where the remaining electric quantity is less than the critical value, the sensing module 50 enters the low-power dimming mode. The critical value may be 60%, 50%, or 30%, etc. For example, in a case where the remaining electric quantity in the power supply module 30 is more than 50%, it is the normal dimming mode, and in a case where the remaining electric quantity is less than 50%, it is the low-power dimming mode.

In the normal dimming mode, it is divided into the with-human state and the without-human state: in the without-human state, the brightness is 20% for the first 3 hours, the brightness is 10% for the next 3 hours, and the lamp is off for the rest of the time until dawn; in the with-human state, the 100% brightness lasts for 15 seconds in the first 6 hours, and the 50% brightness lasts for 15 seconds in the rest of the time. In the low-power dimming mode, the lamp will be turned on automatically after dark, in the without-human state, the brightness will be 10% for the first 6 hours, and the lamp will be off for the rest of the time until dawn, and in the with-human state, the brightness will be 20% and lasts for 15 seconds. In addition, in the without-human state, in a case where a human body appears in an illuminated area, the sensing module 50 can end the without-human state and enter the with-human state in advance; similarly, during the with-human state, it can also be switched to the without-human state according to the actual situation in the illuminated area.

The dawn or dark can be judged according to the output voltage of the charging module 60, in a case where the output voltage of the charging module 60 is greater than the first threshold, it means that there is enough natural light in the environment, that is, it is dawn (the light source module 20 is also powered off in this case); when it is dark, in a case where the output voltage of the charging module 60 is less than the first threshold, it indicates that there is very little natural light in the environment, that is, it is dark (the light source module 20 is energized in this case).

The sensing module 50 may be a microwave module (microwave sensing module or microwave movement sensor module), or other sensors capable of monitoring whether there is human activity in the environment, such as infrared sensors, etc., which will not be repeated.

The housing 10 has a light source part 11, an extending part 12, and an installation part 13. The extending part 12 connects the light source part 11 and the installation part 13. The light source part 11 is provided with the accommodating cavity 111, the bottom wall 112, and the annular wall 113. The extending part 12 is provided with the above-mentioned installation ring 121. The light source part 11 and the installation part 13 are separated and connected by setting the extending part 12. The installation part 13 is installed on a wall, a wallboard, or a pillar, and the light source part 11 and the installation part 13 are kept at a distance to avoid light from directly incident on the wall, the wallboard, or the pillar.

The extending part 12 extends from the annular wall 113 toward a direction away from the axis of the accommodating cavity 111, in other words, projections of the extending part 12 and the installation part 13 on the surface where the bottom wall 112 is located are outside the bottom wall 112 (not located in the region of the bottom wall), so that the light exit path of the light source module 20 installed in the accommodating cavity 111 will not be blocked by the installation part 13 or the extending part 12.

The light source part 11, the extending part 12, and the installation part 13 may be integrally provided, thereby simplifying the structure of the lighting device 100. The installation ring 121 may be connected to the extending part 12.

The installation part 13 is in a sheet shape and includes a first half-ring region 132 and two first installation regions 131. The two first installation regions 131 are respectively located at two ends of the installation part 13, and the first installation region 131 is provided with a first installation hole. Each of the two first installation regions 131 is in a shape of a flat plate and the two first installation regions 131 are located on the same plane, and the two first installation regions 131 of the installation part 13 are attached to the wall or wallboard, and then a fastener is used to pass through the first installation hole to implement the fastening connection between the first installation region 131 and the wall or wallboard, thereby completing the installation and fixation of the lighting device 100. The first installation region 131 may not be provided with the first installation hole, and the installation part 13 may be connected to the wall or wallboard in other ways, such as bonding, plugging, or hooking, etc. The first half-ring region 132 connects the two first installation regions 131. The first half-ring region 132 is in an arc shape and is arched toward the extending part 12, so that the installation part 13 can be installed on a non-planar wall or wallboard, such as on the pillar.

The extending direction of the installation part 13 may be perpendicular to the bottom wall 112, and the extending direction of the first half-ring region 132 and the extending direction of the first installation region 131 are the same as the extending direction of the installation part 13.

The lighting device 100 may further include an installation accessory 80. When the lighting device 100 needs to be installed on a pillar, the installation accessory 80 can be used to cooperate with the installation part 13 to achieve the fixed installation of the lighting device 100. The installation accessory 80 may be in a sheet shape, and the installation accessory 80 may include a second half-ring region 82 and two second installation regions 81, and the two second installation regions 81 are located at two ends of the installation accessory 80, respectively. Each of the two second installation regions 81 is in a shape of a flat plate and the two second installation regions 81 are located on the same plane. The second half-ring region 82 connects the two second installation regions 81, and the second half-ring region 82 is arched in an arc shape. The two first installation regions 131 can be connected to the two second installation regions 81 in a butt-joint manner, and the first half-ring region 132 and the second half-ring region 82 can be spliced into an open ring or a closed ring to clamp an object, such as a pillar, between the first half-ring region 132 and the second half-ring region 82, the first installation region 131 is provided with a first installation hole, and the second installation region 81 is provided with a second installation hole. The fastener passes through the first installation hole and the second installation hole to achieve the connection between the installation accessory 80 and the installation part 13. Both the first half-ring region 132 and the second half-ring region 82 are clamped on the pillar to achieve the installation and fixation of the lighting device 100.

The light source module 20 has a light exit surface 22 on which the light emitting unit 21 is installed, and the lighting device 100 further includes a light distribution element 90, and the light distribution element 90 is covered on the light exit surface 22. The light distribution element 90 has a light incident surface 91 and a light exit surface 92, which are opposite to each other. The light incident surface 91 faces the light exit surface 22 and is provided with an accommodating region 24 that avoids the light emitting unit 21, and the sensing module 50 is provided on the accommodating region 24, the light exit surface 92 may be a flat surface, which is convenient for cleaning and maintenance.

The light distribution element 90 may include a lens 93, the lens 93 extends from the light incident surface 91 toward the light exit surface 22 and is covered on the light emitting unit 21. The lens 93 is a deflection lens 93, and can make the emitted light of the light emitting unit 21 emit in a deflected form. The deflection lens 93 may be a total reflection sheet lens 93. In a direction from the light source part 11 to the installation part 13, the deflection lens 93 is symmetrically arranged, and the light distribution of the deflection lens 93 is also bilaterally symmetrical; and in a direction perpendicular to the direction from the light source part 11 to the installation part 13, the light distribution of the deflection lens 93 is a deflected light distribution, and the light is deflected to a direction away from the installation part 13, so as to avoid light from concentrating on the area close to the installation part 13.

A positioning pillar 1132 is provided in the accommodating cavity 111, the positioning pillar 1132 extends from the bottom wall 112 toward the light exit opening 115 and is attached to the annular wall 113. A fastener passes through the light distribution element 90 and the positioning pillar 1132 and can achieve the fastening connection between the light distribution element 90 and the housing 10.

The lighting device 100 may further include a light shielding element 94, and the light shielding element 94 has a light shielding part 942 and a connection part 941, the connection part 941 is connected to the positioning pillar 1132, and the light shielding part 942 extends from the connection part 941 in a direction away from the bottom wall 112, the light shielding element 94 is used to control the emitted light of the light source module 20 to avoid the scattering of the light, thereby achieving concentrated lighting. The connection part 941 is in a ring shape, and is connected with the positioning pillar 1132 through threads.

The assembly process of the lighting device 100 provided by the examples of the present disclosure is summarized as follows: installing the control module 40 and the power supply module 30 in the accommodating cavity 111, and then installing the light source module 20, the sensing module 50, and the light distribution element in sequence; connecting the charging module 60 to the housing 10, and electrically connecting the charging module 60 to the control module 40 and the power supply module 30 in the accommodating cavity 111, thereby completing the assembly of the lighting device 100.

Therefore, the lighting device provided by the examples of the present disclosure includes the housing, the light source module, the power supply module, the control module, and the sensing module. The light source module, the power supply module, and the control module are collectively accommodated in the accommodating cavity of the housing. Compared with the prior art, in the lighting device of the present disclosure, the light source module, the power supply module, the control module, and the sensing module are accommodated in a centralized manner, instead of separating and arranging the modules in respective housings, respectively, thereby making the overall structure of the lighting device more compact and the volume of the lighting device smaller.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The examples described above further describe the purpose, technical solutions, and beneficial effects of the present disclosure in detail. It should be understood that what have been described above are only some implementations of the present disclosure and are not intended to limit the present disclosure. Any modifications, equivalent substitutions, improvement, etc., made within the spirit and principle of the present disclosure shall be included in the protection scope of the present disclosure.

What is claimed is:

1. A lighting device, comprising:
   a housing, wherein the housing comprises an accommodating cavity, a bottom wall and an annular wall, the accommodating cavity is enclosed by the bottom wall and the annular wall, and the accommodating cavity comprises a light exit opening opposite to the bottom wall;
   a light source module, wherein the light source module comprises a light exit surface facing the light exit opening;
   a power supply module, wherein the power supply module is electrically connected to the light source module;
   a control module, wherein the control module is electrically connected to the power supply module;
   a sensing module, wherein the sensing module is electrically connected to the control module; and
   a charging module comprising a supporting component and a charging board, wherein the supporting component comprises a supporting surface and a back surface, and the supporting component comprises an adjustment part, and the adjustment part is connected to the back surface; and the charging board is disposed on the supporting surface, and the adjustment part is connected to the connection assembly; and wherein the light source module, the power supply module, the control module, and the sensing module are accommodated in the accommodating cavity, the sensing module is configured to detect environmental information, and the control module is configured to adjust brightness of the light source module in combination with remaining electric quantity of the power supply module and the environmental information.

2. The lighting device according to claim 1, wherein:
the environmental information comprises a with-human state or a without-human state; and
the sensing module has a normal dimming mode and a low-power dimming mode, in a case where the remaining electric quantity is greater than a critical value, the sensing module enters the normal dimming module, and in a case where the remaining electric quantity is less than or equal to the critical value, the sensing module enters the low-power dimming mode.

3. The lighting device according to claim 1, further comprising:
a connection assembly, wherein the connection assembly is connected to the housing and the charging module, and the charging module is electrically connected to the control module and the power supply module.

4. The lighting device according to claim 3, wherein:
the charging module comprises an output terminal for outputting electric energy, and the output terminal is connected to the power supply module; and
the control module comprises a voltage monitoring sub-module and a driving sub-module, the voltage monitoring sub-module is connected to the output terminal to obtain an output voltage of the output terminal, in a case where the output voltage of the output terminal is greater than or equal to a first threshold, the driving sub-module drives the light source module to be powered off, and in a case where the output voltage of the output terminal is less than the first threshold, the driving sub-module drives the light source module to be powered on.

5. The lighting device according to claim 4, wherein:
an input voltage of the power supply module is a second threshold, and the second threshold is greater than the first threshold;
in a case where the output voltage of the charging module is greater than the second threshold, the driving sub-module drives the charging module to charge the power supply module; and
in a case where the output voltage of the charging module is between the first threshold and the second threshold, the driving sub-module drives the charging module to stop charging the power supply module, and the driving sub-module drives the light source module to be powered off.

6. The lighting device according to claim 4, wherein:
wherein the supporting component comprises the supporting surface and the back surface that are disposed opposite to each other.

7. The lighting device according to claim 6, wherein around a direction perpendicular to an extending direction of the connection assembly, the adjustment part is rotatably connected with the connection assembly.

8. The lighting device according to claim 6, wherein:
the connection assembly comprises a connection component, a rotating shaft, and a locking shaft, the connection component is connected to the housing and is disposed in a direction away from the light exit opening, the rotating shaft and the locking shaft are disposed in parallel and are both disposed perpendicular to an extending direction of the connection component; the adjustment part comprises a rotating hole and at least two groups of locking holes, the rotating hole and the at least two groups of locking holes are disposed in parallel, and all locking holes in each group are disposed coaxially; and
the rotating shaft connects the connection component and the rotating hole, and the locking shaft connects the connection component and one group of locking holes.

9. The lighting device according to claim 8, wherein around an axis of the connection assembly, the connection assembly is rotatably disposed relative to the housing.

10. The lighting device according to claim 9, wherein the housing is provided with an installation ring, the installation ring extends from the housing in a direction away from the light exit opening, and the connection component is rotatably nested in the installation ring.

11. The lighting device according to claim 1, wherein the housing comprises a light source part, an extending part, and an installation part, and the extending part connects the light source part and the installation part; the light source part comprises the accommodating cavity, the bottom wall, and the annular wall; the extending part extends from the annular wall in a direction away from an axis of the accommodating cavity.

12. The lighting device according to claim 11, wherein the light source part, the extending part, and the installation part are integrally provided.

13. The lighting device according to claim 11, wherein the installation part is in a sheet shape and comprises a first half-ring region and two first installation regions; the two first installation regions are respectively located at two ends of the installation part, and the two first installation regions are in shapes of at plates and located on a same plane; the first half-ring region connects the two first installation regions, and the first half-ring region is in an arc shape and is arched toward the extending part.

14. The lighting device according to claim 13, further comprising:
an installation accessory, wherein the installation accessory is in a sheet shape, and the installation accessory comprises a second half-ring region and two second installation regions;
the two second installation regions are respectively located at two ends of the installation accessory, the two second installation regions are in shapes of flat plates and are located on a same plane; the second half-ring region connects the two second installation regions, and the second half-ring region is arched in an arc shape;
the two first installation regions are connected to the two second installation regions in a butt-joint manner, and the first half-ring region and the second half-ring region are spliced into an open ring or a closed ring.

15. The lighting device according to claim 11, further comprising:
a light distribution element, wherein a light emitting unit is installed on the light exit surface, and the light distribution element covers the light exit surface and is connected to the housing; the light distribution element has an light incident surface, the light incident surface faces the light exit surface and is provided with an accommodating region that avoids the light emitting unit, and the sensing module is installed on the accommodating region.

16. The lighting device according to claim 15, wherein the light distribution element comprises a lens, the lens extends from the light incident surface toward the light exit surface, the lens covers the light emitting unit, and the lens is a deflection lens.

17. The lighting device according to claim 16, wherein along a direction from the light source part to the installation part, the deflection lens is symmetrically disposed; along a direction perpendicular to the direction from the light source part to the installation part, light distribution of the deflection lens is a deflected light distribution, and the deflection lens deflects and distributes light in a direction away from the installation part.

18. The lighting device according to claim 1, wherein a positioning pillar is provided in the accommodating cavity, the positioning pillar extends from the bottom wall toward the light exit opening and is attached to the annular wall; the lighting device further comprises a light shielding element, the light shielding element has a light shielding part and a connection part, the connection part is connected to the positioning pillar, and the light shielding part extends from the connection part in a direction away from the bottom wall.

19. The lighting device according to claim 3, wherein the sensing module is a microwave module; and/or the charging module is a photovoltaic module.

20. A lighting device, comprising:
a housing, wherein the housing comprises an accommodating cavity, a bottom wall and an annular wall, the accommodating cavity is enclosed by the bottom wall and the annular wall, and the accommodating cavity comprises a light exit opening opposite to the bottom wall;
a light source module, wherein the light source module comprises a light exit surface facing the light exit opening;
a power supply module, wherein the power supply module is electrically connected to the light source module;
a control module, wherein the control module is electrically connected to the power supply module;
a sensing module, wherein the sensing module is electrically connected to the control module; and
a charging module comprising a supporting component and a charging board, wherein the supporting component comprises a supporting surface and a back surface, and the supporting component comprises an adjustment part, and the adjustment part is connected to the back surface; and the charging board is disposed on the supporting surface, and the adjustment part is connected to the connection assembly; and
wherein the light source module, the power supply module, the control module, and the sensing module are accommodated in the accommodating cavity.

* * * * *